UNITED STATES PATENT OFFICE 2,220,402

PRINTING COLORS AND PROCESS OF PRINTING

Charles Graenacher, Riehen, and Paul Streuli, Basel, Switzerland, assignors to Society of Chemical Industry in Basle, Basel, Switzerland No Drawing. Application July 17, 1939, Serial No. 284,952. In Switzerland August 10, 1938

4 Claims. (Cl. 8—62)

It has been found that textile materials, for example vegetable, animal and synthetic fibers (cotton, artificial silk from regenerated cellulose, wool and silk) can be printed with water-soluble acyl derivatives of sparingly soluble dyestuffs containing the group determining the water solubility of the product in the acyl radical, when using in the printing water-soluble N,N'-diacylated methylene diamines of the general formula

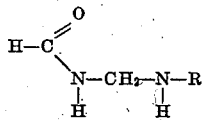

wherein R represents the radical of an acid containing at most 4 carbon atoms, for instance above all dimethylene formamide, further methylene formacetamide, methylene formpropionylamide or methylene formbutylamide.

Acyl derivatives of sparingly soluble dyestuffs of the above kind and their application are described for example in applications Serial No. 92,244, filed July 23, 1936, now United States Patent 2,170,262 and No. 173,528, filed November 8, 1937; further in Patents No. 2,120,741 and No. 2,095,600. The application of these dyestuffs is also described in applications Serial No. 217,633, filed July 5, 1938, now United States Patent 2,187,453; No. 261,841, filed March 14, 1939; and No. 261,842, filed March 14, 1939.

The methylene compounds used according to the present process may be added for example to the printing pastes. They may also be mixed with pulverulent water-soluble acyl derivatives whereby powders are obtained which are suitable for use in printing. It may be appropriate in many cases to use also other hydrotropic additions suitable in printing besides the cited methylene compounds, for instance hydantoins, alkylthio-glycollic acid amides, water-soluble salts of benzylaniline- or cymene sulfonic acid, water-soluble salts of substituted aromatic carboxylic acids or of dicarboxylic acid semi-esters, further water-soluble alcohols, for instance glycerine, ethylene glycol or thiodiglycol. The mixtures consisting of methylene compounds and the hydrotropic agents, for instance dimethylhydantoin, may be added both to the printing pastes and to the pulverulent water-soluble dyestuff derivatives.

The present process may be used in all kinds of textile printing, for example in discharge printing or direct printing, for instance on fabrics or yarns; the prints are developed according to the known processes mentioned at the beginning of this specification.

The prints obtainable according to the present invention are generally of deeper color than the prints obtained with the same quantity of dyestuff, but without use of the methylene compounds. The unexpected property of increasing in many cases the degree of affinity of fiber to dyestuff may be referred to a swelling effect. It is often possible to increase the purity or fastness of the prints when working according to the present process.

The methylene compounds to be used according to the present process have the advantage of representing generally odorless, solid products which can be mixed without any trouble with dyestuff derivatives used.

The following examples illustrate the invention:

Example 1

A printing color of the following constitution is prepared:

|  | Grams |
|---|---|
| The product of the action of benzoylchloride-meta-sulfonic acid on the azo-dyestuff from diazotized 3-chloraniline and 2:3-hydroxynaphthoic acid-ortho-anisidide | 80 |
| Methylene diformamide | 140 |
| Water | 320 |
| Starch tragacanth thickening | 460 |

This paste is printed on a fabric consisting of cotton, artificial silk from regenerated cellulose, natural silk, wool or of a mixture of two or more of these materials. The printed fabric is dried, steamed for 4–8 minutes in a Mather-Platt apparatus and drawn for 4–6 minutes at room temperature through a solution containing 1.2 per cent of sodium hydroxide, 1.5–2 per cent of barium chloride and 5 per cent of sodium chloride. It is then rinsed, acidified, again rinsed and soaped at the boil. A fast orange print is thus obtained.

Instead of methylene diformamide there may further be used in printing methylene formacetamide which is obtained as follows:

118 parts by weight of acetamide are heated for 30 minutes at 60° C. with 162 parts by weight of formaldehyde of 37 per cent strength and 2 parts by weight of potassium carbonate, and the product thus obtained is made feebly acid with hydrochloric acid. There are then added 95 parts by weight of formamide, the whole is heated for 1 hour to 50° C. while stirring and made neutral, whereupon the water is evaporated in a vacuum and the methylene-formacetamide which has formed is distilled in a vacuum. It has a boiling point of 148–158° C. under 12 mm. pressure.

*Example 2*

A printing color is made of the following constitution:

| | Grams |
|---|---|
| The product of the action of benzoyl chloride sulfonic acid on the azo-dyestuff from diazotized 2:5-dichloraniline and 2:3-hydroxynaphthoic acid-ortho-anisidide | 80 |
| Methylene diformamide | 90 |
| 5:5-dimethylhydantoin or thiodiglycol | 90 |
| Water | 240 |
| Starch tragacanth thickening | 500 |

This paste is printed on a fabric of the kind indicated in Example 1, the printed fabric is dried, steamed and developed as described in Example 1. There are obtained fast prints of vivid scarlet red color.

*Example 3*

A printing color is made of the following constitution:

| | Grams |
|---|---|
| The product of the action of benzoylchloride sulfonic acid on the condensation product from 1 mol of cyanuric chloride, 2 mols of 2-aminoanthraquinone and 1 mol of aniline | 60 |
| Methylene diformamide | 75 |
| Dimethyl hydantoin | 75 |
| Water | 290 |
| Starch tragacanth thickening | 500 |

This paste is printed on a fabric of the kind indicated in Example 1, the printed fabric is dried, steamed and developed as described in Example 1. There are obtained fast yellow prints.

*Example 4*

A printing color is made of the following constitution:

| | Grams |
|---|---|
| The product of the action of benzoylchloride sulfonic acid on the azo-dyestuff from diazotized 1-amino-2-methyl-4-chlorobenzene and 2:3-hydroxynaphthoic acid-2'-methyl-4'-chloraniline | 80 |
| Methylene diformamide | 80 |
| 1-acetyl-5:5-dimethyl hydantoin | 80 |
| Water | 260 |
| Starch tragacanth thickening | 500 |

This paste is printed on a fabric of the kind indicated in Example 1, the printed fabric is dried, steamed and developed as described in Example 1. There are obtained fast red tints.

*Example 5*

A printing color is made of the following constitution:

| | Grams |
|---|---|
| The product of the action of benzoylchloride sulfonic acid on the azo-dyestuff from diazotized 2:5-diethoxy-4-benzoylaminoaniline and 2:3-hydroxynaphthoic acid anilide | 50 |
| Methylene diformamide | 80 |
| Thiodiglycol | 80 |
| Water | 275 |
| Starch tragacanth thickening | 485 |

The paste is printed on a fabric of the kind indicated in Example 1, the printed fabric is dried, steamed and developed as described in Example 1. There are obtained fast blue prints.

Blue prints are also obtained with the ester-like condensation product from benzoylchloride sulfonic acid and the azo-dyestuff from the anilide of 2:3-hydroxynaphthoic acid and the diazotized 2:5-diethoxy-4-carbethoxy-amino-aniline.

What we claim is.

1. Printing colors suitable for printing vegetable, animal and synthetic fibers, which contain a water-soluble acyl derivative of a difficultly soluble dyestuff in which the water-solubilizing group is in the acyl radical, and which also contain a water-soluble N,N'-diacylated methylene diamine of the general formula

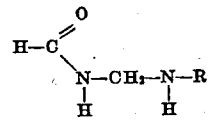

wherein R stands for the radical of an acid containing at most 4 carbon atoms.

2. Printing colors suitable for printing vegetable, animal and synthetic fibers, which contain a water-soluble acyl derivative of a difficultly soluble dyestuff in which the water-solubilizing group is in the acyl radical, and which also contain methylene diformamide.

3. Printing colors suitable for printing vegetable, animal and synthetic fibers, which contain a water-soluble acyl derivative obtained from a halide of a benzoic sulfonic acid and a water-insoluble azo-dyestuff from an arylide of the 2:3-hydroxy-naphthoic acid and a diazotized amine, and which also contain methylene diformamide.

4. Printing colors suitable for printing vegetable, animal and synthetic fibers, which contain the product of the action of benzoyl chloride-meta-sulfonic acid on the azo-dyestuff from diazotized 3-chloraniline and 2:3-hydroxy-naphthoic acid-ortho-anisidide, and which also contain methylene diformamide.

CHARLES GRAENACHER.
PAUL STREULI.